US012728427B2

(12) United States Patent
Lee

(10) Patent No.: US 12,728,427 B2
(45) Date of Patent: Sep. 8, 2026

(54) CENTRIFUGAL PISTON AND CENTRIFUGAL SEPARATION DEVICE HAVING SAME

(71) Applicant: Jun Seok Lee, Busan (KR)

(72) Inventor: Jun Seok Lee, Busan (KR)

( * ) Notice: Subject to any disclaimer, the term of this patent is extended or adjusted under 35 U.S.C. 154(b) by 562 days.

(21) Appl. No.: 18/038,383

(22) PCT Filed: Nov. 7, 2022

(86) PCT No.: PCT/KR2022/017353
§ 371 (c)(1),
(2) Date: May 23, 2023

(87) PCT Pub. No.: WO2023/085708
PCT Pub. Date: May 19, 2023

(65) Prior Publication Data

US 2023/0405610 A1 Dec. 21, 2023

(30) Foreign Application Priority Data

Nov. 9, 2021 (KR) ........................ 10-2021-0152903
Nov. 4, 2022 (KR) ........................ 10-2022-0145970

(51) Int. Cl.
*B04B 11/04* (2006.01)
*B04B 5/04* (2006.01)

(52) U.S. Cl.
CPC ............ *B04B 11/04* (2013.01); *B04B 5/0421* (2013.01)

(58) Field of Classification Search
CPC ....... B04B 11/04; B04B 5/0421; B04B 11/00; B04B 2005/0485; B04B 5/0442; B04B 7/00; B01D 21/26; B01D 21/262; B01L 3/5021; G01N 33/483; G01N 33/487
USPC ...................................................... 494/16, 20
See application file for complete search history.

(56) References Cited

U.S. PATENT DOCUMENTS 5,728,038 A 3/1998 Coffey et al.

FOREIGN PATENT DOCUMENTS

| | | | | | |
|---|---|---|---|---|---|
| JP | H01-295164 | A | | 11/1989 | |
| JP | 2007-533396 | A | | 11/2007 | |
| JP | 2017-164020 | A | | 9/2017 | |
| JP | 2018-100771 | A | | 6/2018 | |
| KR | 10-2012-0092332 | A | | 8/2012 | |
| KR | 10-2013-0088113 | A | | 8/2013 | |
| KR | 10-2019-0026585 | A | | 3/2019 | |
| KR | 20190026585 | A | * | 3/2019 | .......... A61M 1/0068 |
| KR | 10-2019-0092105 | A | | 8/2019 | |

(Continued)

OTHER PUBLICATIONS

International Search Report for PCT/KR2022/017353 mailed Feb. 14, 2023 from Korean Intellectual Property Office.

(Continued)

*Primary Examiner* — Claire X Wang
*Assistant Examiner* — Shuyi S. Liu
(74) *Attorney, Agent, or Firm* — Paratus Law Group, PLLC

(57) ABSTRACT

Disclosed is a centrifugal piston including a piston body and a weight. In a centrifugal environment, a first outer weight surface of the weight is configured to get in contact with a first inner body surface of the piston body, and a gap is formed between the first inner body surface and a recess of the weight.

15 Claims, 13 Drawing Sheets

(56) References Cited

FOREIGN PATENT DOCUMENTS

| | | |
|---|---|---|
| KR | 10-2446918 B1 | 9/2022 |

OTHER PUBLICATIONS

Chinese Office Action for related CN Application No. 202280007530.1 mailed May 29, 2025 from China National Intellectual Property Administration.

Japanese Notice of Allowance for related JP Application No. 2023-531621 mailed Jun. 4, 2024 from Japan Patent Office.

* cited by examiner

CENTRIFUGAL PISTON AND CENTRIFUGAL SEPARATION DEVICE HAVING SAME

CROSS-REFERENCE TO PRIOR APPLICATIONS

This Application is a National Stage Application of PCT International Patent Application No. PCT/KR2022/017353 (filed on Nov. 7, 2022), which claims priority to Korean Patent Application Nos. 10-2021-0152903 (filed on Nov. 9, 2021) and 10-2022-0145970 (filed on Nov. 4, 2022), which are all hereby incorporated by reference in their entirety.

BACKGROUND

The present disclosure relates to a centrifugal piston and a centrifugal separation device having the same.

Techniques for removing impurities (e.g., oil) from adipose tissues obtained from a living body by suction and incision are being developed in order to obtain pure adipose tissue masses. For example, Korean Patent No. 10-2446918 discloses a piston for centrifugation. The conventional art mentioned above cannot necessarily be considered as a prior art that was publicly known before the filing of the present disclosure, as it was acquired or obtained during the process of conceiving the present disclosure.

SUMMARY

An aspect of the present disclosure is to provide a centrifugal piston, which allows passage of target substances (e.g., oil) of a predetermined size or smaller through a passage without closing the passage when centrifugal force is applied, and a centrifugal separation device having the same.

According to an aspect of the present disclosure, there is provided a centrifugal piston including: a piston body; and a weight, wherein the piston body includes: a first outer body surface; a second outer body surface opposite to the first outer body surface; a side outer body surface between the first outer body surface and the second outer body surface; a first inner body surface opposite to the first outer body surface; a side inner body surface connected to the first inner body surface and opposite to the side outer body surface; a first inlet disposed in the first outer body surface; an outlet disposed in the second outer body surface; a hollow portion defined by the first inner body surface and the side inner body surface; and a first inflow passage connecting the first inlet and the hollow portion, wherein the weight is arranged in the hollow portion, and includes: a first outer weight surface facing the first inner body surface; a second outer weight surface opposite to the first outer weight surface; a side outer weight surface between the first outer weight surface and the second outer weight surface; and a recess disposed on the first outer weight surface, wherein, in a centrifugal environment, when the first outer weight surface comes into contact with the first inner body surface, the weight is configured to form a gap between the first inner body surface and the recess, and wherein at least one substance centrifugally separated from biological tissues is discharged through the first inlet, the first inflow passage, the gap, and the outlet.

In an embodiment, the gap has a size ranging from about 50 μm to about 200 μm, measured as a distance between the first inner body surface and the recess.

In an embodiment, the gap has a substantially constant size between the first outer weight surface and the side outer weight surface.

In an embodiment, the hollow portion includes a discharge passage which connects the first inflow passage and the outlet and includes a gap.

In an embodiment, the recess includes: a recess wall surface intersecting the first outer weight surface; and a recess bottom surface between the recess wall surface and the side outer weight surface.

In an embodiment, the recess wall surface does not overlap with the first inflow passage.

In an embodiment, the recess bottom surface overlaps with both the first inflow passage and the first inner body surface.

In an embodiment, the recess bottom surface is directly connected to the side outer weight surface.

In an embodiment, the recess is formed in the circumferential direction of the weight.

In an embodiment, the piston body further includes: a second inlet disposed in the first outer body surface; and a second inflow passage connecting the second inlet and the hollow portion.

In an embodiment, the centrifugal piston further includes a seal disposed on the side inner body surface and configured to seal a space between a plunger and the outlet.

In an embodiment, the centrifugal piston further includes a stopper disposed on the side inner body surface and between the weight and the seal, and configured to restrict the movement of the seal.

In an embodiment, the centrifugal piston further includes a fastening portion disposed between the weight and the outlet.

In an embodiment, the centrifugal piston further includes a seal arranged on the side outer weight surface.

In another aspect of the present disclosure, there is provided a centrifugal separation device including: a rotational shaft; a syringe configured to rotate around the rotating shaft and configured to hold biological tissues; and a centrifugal piston arranged inside the syringe, wherein the centrifugal piston comprises a piston body and a weight. The piston body includes: a first outer body surface; a second outer body surface opposite to the first outer body surface; a side outer body surface between the first outer body surface and the second outer body surface; a first inner body surface opposite to the first outer body surface; a side inner body surface connected to the first inner body surface and opposite to the side outer body surface; a first inlet disposed in the first outer body surface; an outlet disposed in the second outer body surface; a hollow portion defined by the first inner body surface and the side inner body surface; and a first inflow passage connecting the inlet and the hollow portion. The weight is arranged in the hollow portion, and includes: a first outer weight surface facing the first inner body surface; a second outer weight surface opposite to the first outer weight surface; a side outer weight surface between the first outer weight surface and the second outer weight surface; and a recess disposed on the first outer weight surface. In a centrifugal environment that the syringe rotates around the rotational shaft, when the first outer weight surface comes into contact with the first inner body surface, the weight is configured to form a gap between the first inner body surface and the recess, and at least one substance centrifugally separated from biological tissues is discharged through the first inlet, the first inflow passage, the gap, and the outlet.

In another aspect of the present invention, there is provided a method of using a centrifugal separation device, including the steps of: providing biological tissues and a centrifugal piston inside the syringe; and rotating the syringe around the rotational shaft to centrifugally separate the biological tissues, wherein the step of centrifugally separating the biological tissues comprises the step of discharging at least one substance separated from the biological tissues through the inlet, the first inflow passage, the gap, and the outlet, when the first outer weight surface comes into contact with the first inner body surface.

According to an embodiment of the present disclosure, target substances of a predetermined size or smaller can pass through the passage without closing the passage when centrifugal force is applied. The effects of the centrifugal piston and the centrifugal separation device are not limited to the above-mentioned effects and further effects not described above will be clearly understood by those skilled in the art.

BRIEF DESCRIPTION OF THE DRAWINGS

The accompanying drawings, which are incorporated into and form a part of the disclosure of specific embodiments of the present disclosure, illustrate various embodiments and features, and serve to explain the principles of the present disclosure in detail.

DETAILED DESCRIPTION

Figure 1:
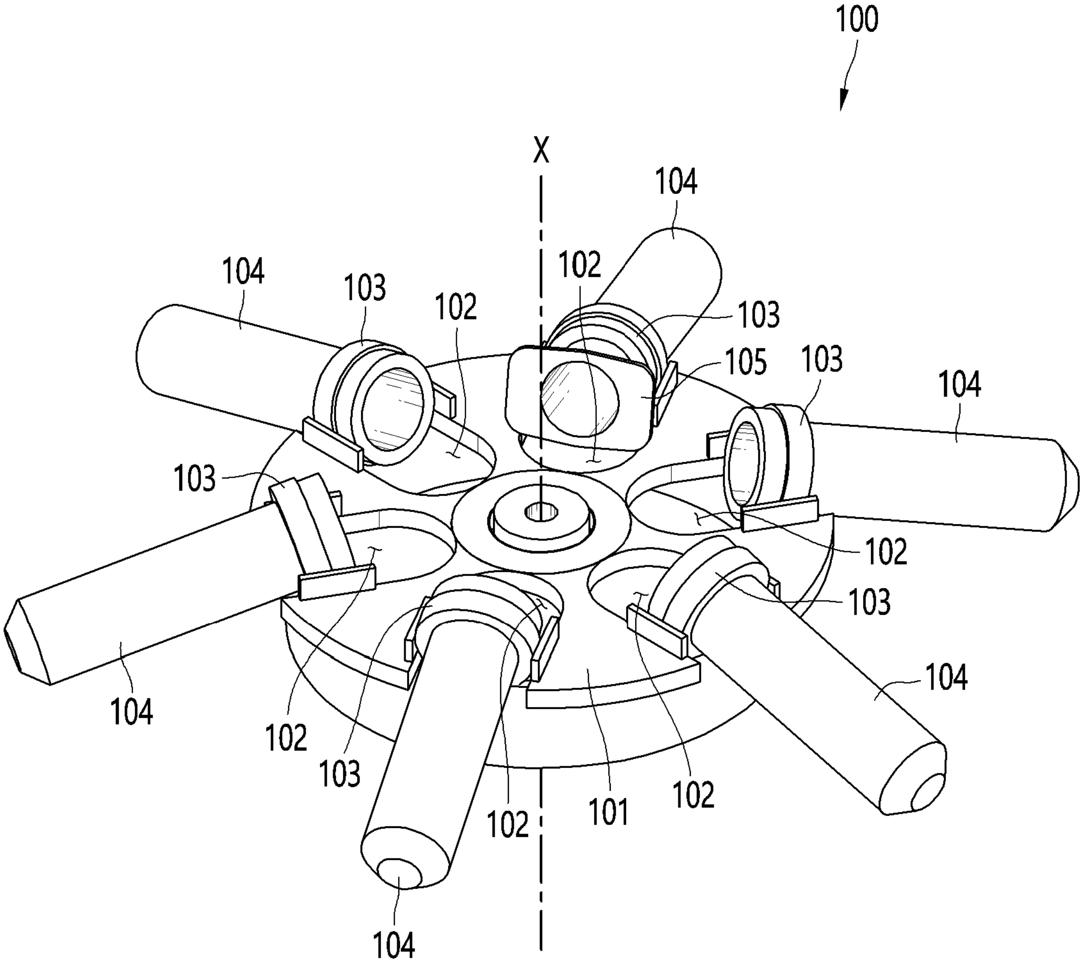
FIG. 1 is a perspective view of a centrifugal separation device according to an embodiment of the present disclosure.

Hereinafter, detailed descriptions of exemplary embodiments are provided with reference to the accompanying drawings. However, it should be understood that the scope of the present disclosure is not limited or restricted by these exemplary embodiments, as various modifications may be made thereto. All changes, equivalents, or substitutions for exemplary embodiments should be considered to be within the scope of the claims.

The terminology used in the exemplary embodiments is for descriptive purposes only and should not be interpreted with the intention of limitation. The singular expressions include the plural expressions unless otherwise clearly indicated by the context. In this specification, terms such as "including" or "having" are intended to specify the existence of features, numbers, steps, operations, components, parts, or combinations thereof, rather than excluding the existence or possibility of one or more other features, numbers, steps, operations, components, parts, or combinations thereof.

Unless otherwise defined, all terms used herein, including technical or scientific terms, have the same meaning as those commonly understood by those skilled in the art to which the exemplary embodiments belong. Terms that are defined in a dictionary or otherwise commonly used in the context of the relevant technology should be interpreted to have the same meaning as the meaning implied by the context of the relevant technology, and should not be interpreted in an idealistic or overly formal sense unless explicitly defined in this application.

Furthermore, in describing the exemplary embodiments with reference to the accompanying drawings, the same reference numerals are given to the same components regardless of the drawing symbols, and redundant descriptions thereof are omitted if they can unnecessarily obscure the essence of the exemplary embodiments.

In addition, in describing the components of the exemplary embodiments, terms such as "first," "second," "A," "B," "A," "(b)," and the like may be used. These terms are used merely for the purpose of distinguishing one component from another, and do not limit the essence, order, or sequence of the respective components. When a component is described as "connected," "coupled," or "joined" to another component, it should be understood that the component may be directly connected or joined to the other component, or may be connected or joined to another component between the respective components.

Components included in one embodiment and components including common function are described using the same name in other embodiments, unless otherwise indicated. Unless otherwise indicated, the description provided in one embodiment may also apply to other embodiments and specific descriptions are omitted in overlapping ranges.

FIG. 1 is a perspective view of a centrifugal separation device according to an embodiment of the present disclosure.

Referring to FIG. 1, the centrifugal separation device 100 can remove impurities (e.g., oil, blood, medical fluids, and/or other impurities) from biological tissues (e.g., adipose tissues) obtained from a living body (e.g., a human body) in a centrifugal separation environment and obtain pure biological tissues.

The centrifugal separation device 100 may include a base 101. The base 101 may have a substantially flat shape. The base 101 may include a rotational shaft X. The rotational shaft X may be located at the center of the base 101.

The centrifugal separation device 100 may include a plurality of cavities 102. The plurality of cavities 102 may be arranged circumferentially around the base 101.

The centrifugal separation device 100 may include a plurality of hinges 103. The plurality of hinges 103 may be pivotally connected to the base 101.

The centrifugal separation device 100 may include a plurality of holders 104. The plurality of holders 104 may be connected to corresponding hinges 103, respectively. Each of the plurality of holders 104 may be swingable by the corresponding hinge 103 into and out of a corresponding cavity 102. The plurality of holders 104 may be configured to rotate around the rotational shaft X together with the base 101.

The centrifugal separation device 100 may include at least one syringe 105. The syringe 105 may be placed in a corresponding holder 104 among the plurality of holders 104.

Figure 2:
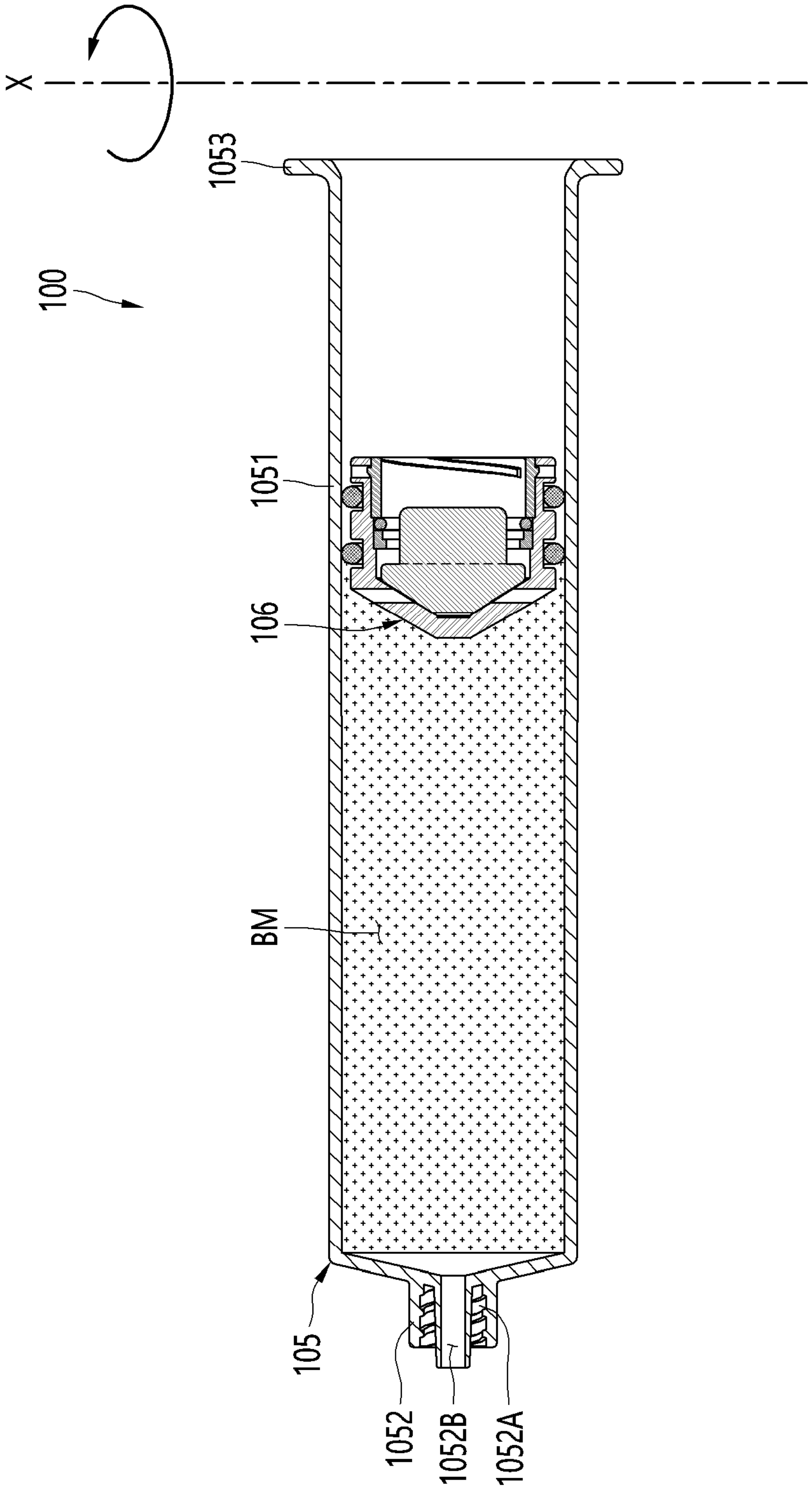
FIG. 2 is a sectional view of the centrifugal separation device according to an embodiment of the present disclosure.

FIG. 2 is a cross-sectional view of a centrifugal separation device according to an embodiment of the present disclosure.

Referring to FIG. 2, the centrifugal separation device 100 may include a syringe 105. The syringe 105 may be configured to rotate about a rotational shaft X within a centrifugal separation environment.

The syringe 105 may include a container 1051. The container 1051 may be configured to hold biological tissues BM. The container 1051 may substantially have a cylindrical shape.

The syringe 105 may include a connector 1052. The connector 1052 may allow at least one first substance (e.g., blood, medical fluid, water, and/or other relatively denser substance compared to pure adipose tissue) to pass through the connector 1052. At least one first substance may be removed from the container 1051 through the connector 1052. The connector 1052 may be positioned at a first end (e.g., front end in FIG. 2) of the container 1051 at a first distance (e.g., relatively far distance) from the rotational shaft X.

The connector 1052 may include a coupling portion 1052A. The coupling portion 1052A may be configured to be coupled to an external removal device (not shown). For example, the coupling portion 1052A may include a screw thread.

The connector 1052 may include a discharge and injection passage 1052B. The discharge and injection passage 1052B may be configured to allow passing of at least one first substance.

The syringe 105 may include a flange 1053. The flange 1053 may be positioned at a second end (e.g., rear end in FIG. 2) of the container 1051 at a second distance (e.g., relatively close distance) from the rotational shaft X. The second end of the container 1051 may be positioned opposite to the first end.

The second end of the container 1051 may be open to the exterior of the syringe 105. Biological tissues BM obtained from a living body may be placed inside the container 1051 through the discharge and injection passage 1052B. A piston 106 may be placed on or above (e.g., at the right in FIG. 2) the biological tissues BM. The piston 106 subjected to centrifugal force in the direction away from the rotational shaft X during use of the centrifugal separation device 100 may compress the biological tissues BM. At least one second substance (e.g., oil and/or other relatively less dense substance compared to pure adipose tissue) within the centrifugal separation environment may be separated from the biological tissues BM. While the piston 106 rotates around the rotational shaft X and compresses the biological tissues BM, at least one second substance may pass through the interior of the piston 106 and escape from the exterior of the piston 106 through a discharge and injection passage 1052B of the piston 106.

Figure 3:
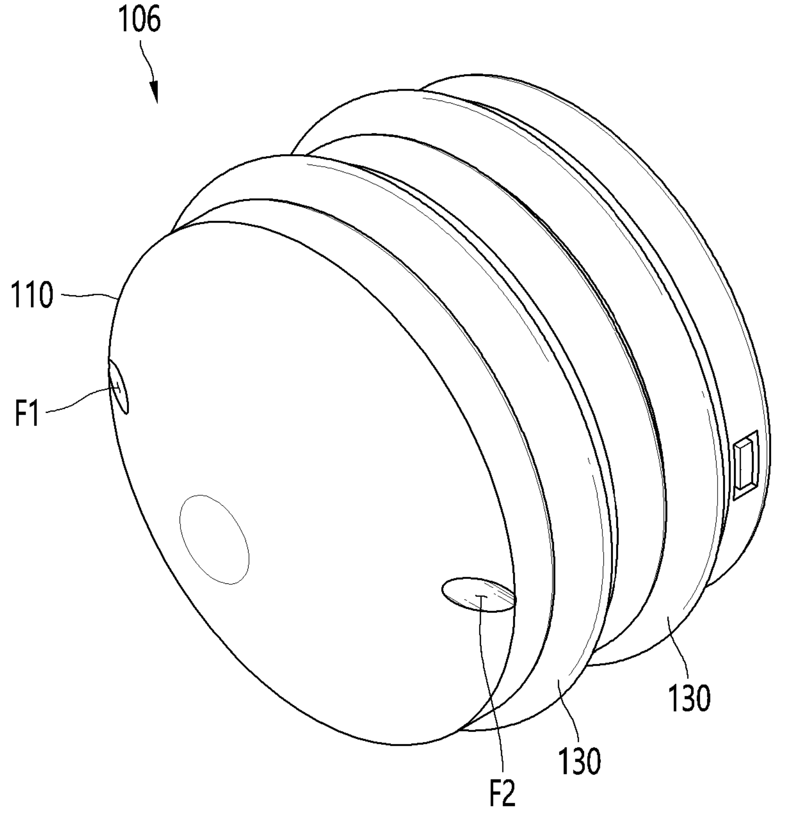
FIG. 3 is a perspective view of a centrifugal piston according to an embodiment of the present disclosure.
Figure 4:
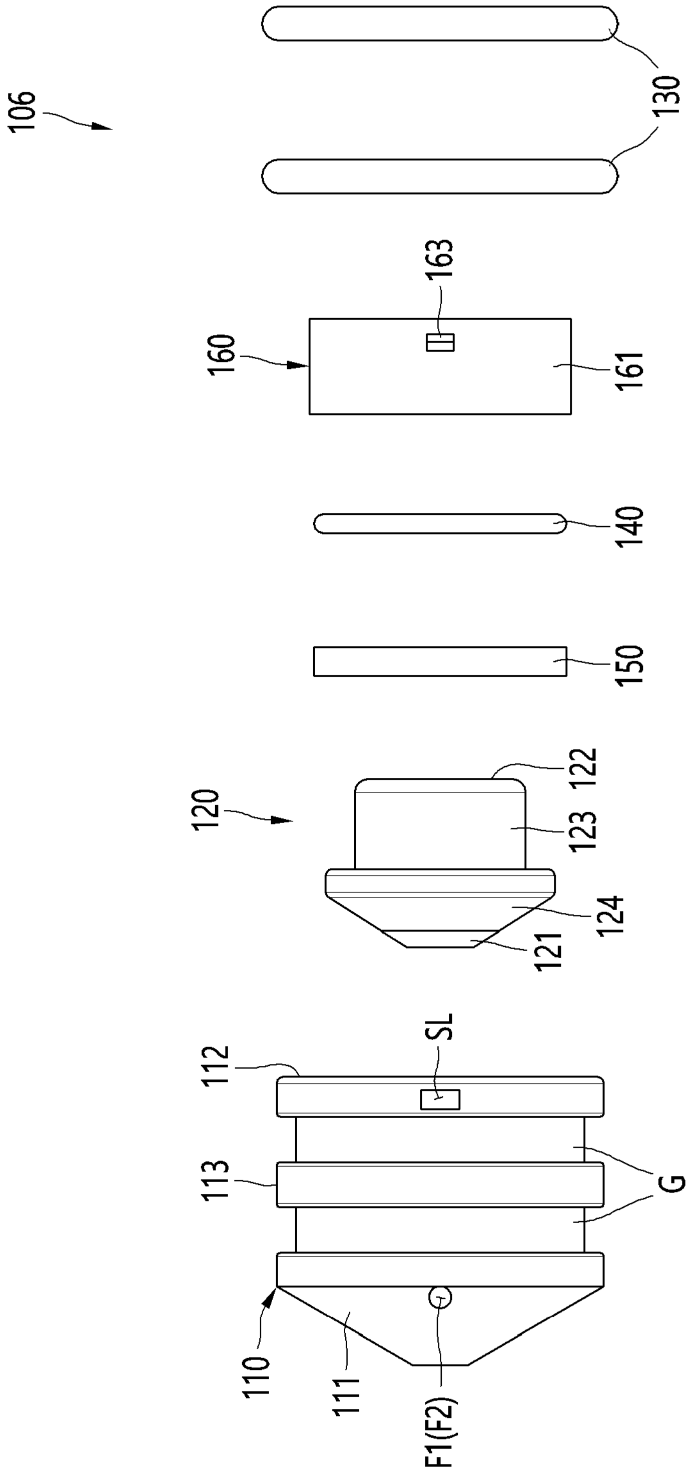
FIG. 4 is an exploded perspective view of the centrifugal piston according to an embodiment of the present disclosure.
Figure 5:
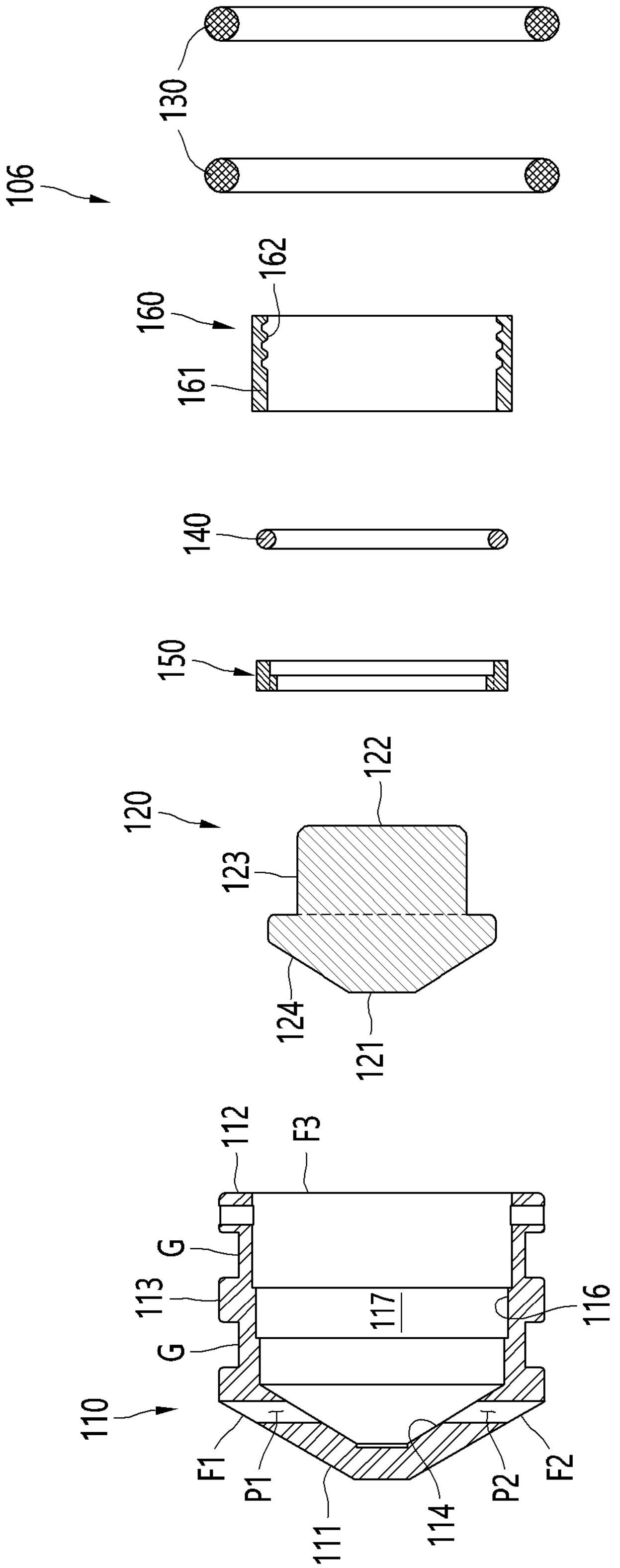
FIG. 5 is an exploded side-sectional view of the centrifugal piston according to an embodiment of the present disclosure.
Figure 6:
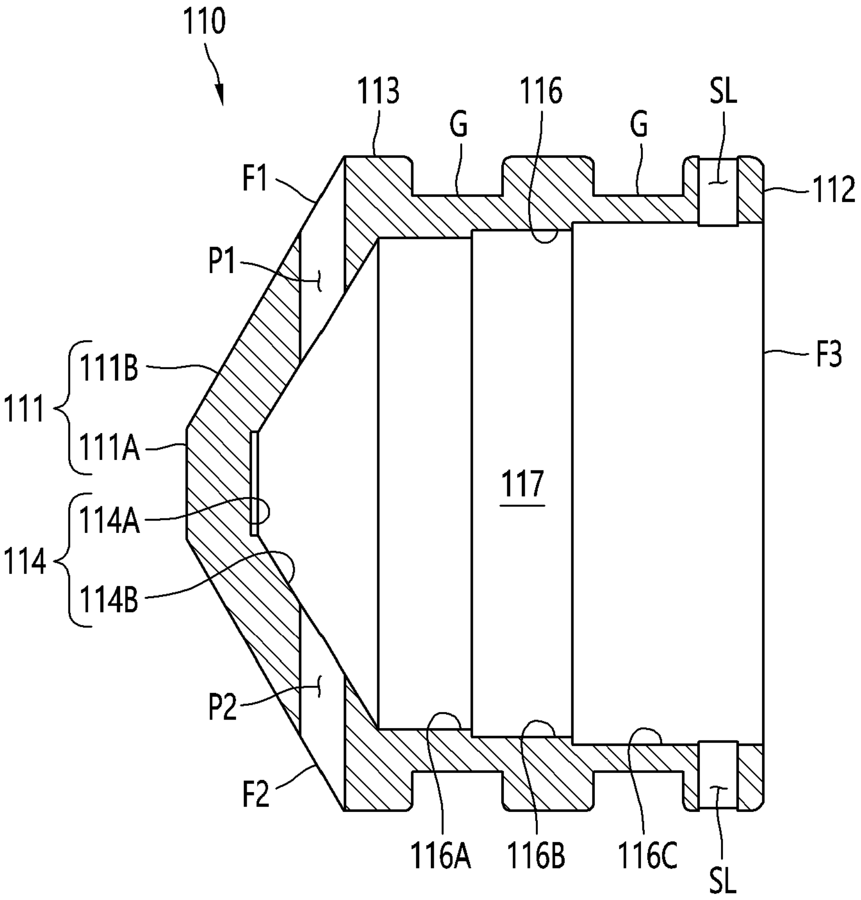
FIG. 6 is a side-sectional side view of a piston body according to an embodiment of the present disclosure.

FIG. 3 is a perspective view of a centrifugal piston according to an embodiment of the present disclosure. FIG. 4 is an exploded perspective view of the centrifugal piston according to the embodiment of the present disclosure. FIG. 5 is a sectional view of the centrifugal piston according to the embodiment. FIG. 6 is a sectional view of a piston body according to the embodiment of the present disclosure.

Referring to FIGS. 3 to 6, the centrifugal piston 106 may include a piston body 110. The piston body 110 may be configured to move within a container 1051 of FIG. 2. For example, the piston body 110 may be configured to move in a direction away from the rotational shaft X in a centrifugal separation environment. The piston body 110 may be configured to compress biological tissues BM.

The piston body 110 may include a first outer body surface 111 (e.g., front outer body surface), a second outer body surface 112 opposite to the first outer body surface 111 (e.g., rear outer body surface), and a side outer body surface 113 between the first outer body surface 111 and the second outer body surface 112.

The first outer body surface 111 may include a first outer region 111A. For example, when the piston 106 of FIG. 2 is positioned in a portion (e.g., front portion) of the container 1051 adjacent to a connector 1052, the first outer region 111A may be configured to compress a space between the connector 1052 and the piston 106. During compression of the space by the first outer region 111A, substances (e.g., air, blood, fluids, and/or water) existing in the space may be facilitated to exit and enter through the exhaust and injection passage 1052B.

The first outer body surface 111 may include a second outer region 111B. The second outer region 111B may include inclined surfaces with respect to the first outer region 111A and the side outer body surface 113, respectively. For example, when the piston 106 is in a centrifugal separation environment, the second outer region 111B may be configured to guide substances existing in the space compressed by the first outer region 111A. The second outer region 111B may be connected to the first outer region 111B and the side outer body surface 113.

The piston body 110 may include a first inner body surface 114 opposite to the first outer body surface 111, and a side inner body surface 116 connected to the first inner body surface 114. The first inner body surface 114 and the side inner body surface 116 may define a hollow portion 117.

The first inner body surface 114 may include a first inner area 114A. The first inner area 114A may be positioned opposite to a first outer area 111A.

The first inner body surface 114 may include a second inner area 114B. The second inner area 114B may be positioned opposite to the second outer area 111B. The second inner area 114B may include a sloping surface with respect to the first inner area 114A. The second inner area 114B may be connected to the first inner area 114A.

The side inner body surface 116 may include a first side inner area 116A. The first side inner area 116A may define a first inner diameter of the hollow portion 117. The first side inner area 116A may be connected to the second inner area 114B.

The side inner body surface 116 may include a second side inner area 116B. The second side inner area 116B may define a second inner diameter of the hollow portion 117. The second inner diameter may be larger than the first inner diameter. The second side inner area 116B may be connected to the first side inner area 116A.

The side inner body surface 116 may include a third side inner area 116C. The third side inner area 116C may define a third inner diameter of the hollow portion 117. The third inner diameter may be larger than the second inner diameter.

The third side inner area 116C may be connected to the second side inner area 116B and the second outer body surface 112.

The side inner body surface 116 may include a first step arranged between the first side inner area 116A and the second side inner area 116B. The side inner body surface 116 may include a second step arranged between the second side inner area 116B and the third side inner area 116C.

The piston body 110 may include multiple grooves G. The multiple grooves G may be arranged on the side outer body surface 113. The multiple grooves G may be arranged along the side outer surface 113 between the first outer body surface 111 and the second outer body surface 112.

The piston body 110 may include a first inlet F1. The first inlet F1 may be configured to allow material on the first outer body surface 111 to flow into the piston body 110. The first inlet F1 may be arranged on the second outer region 111B.

The piston body 110 may include a second inlet F2. The second inlet F2 may be configured to allow material on the first outer body surface 111 to flow into the piston body 110. The second inlet F2 may be arranged in a different portion region of the second outer region 111B from where the first inlet F1 is arranged. The position of the second inlet F2 may be opposite to the position of the first inlet F1.

The piston body 110 may include a first inflow passage P1. The first inflow passage P1 may be configured to fluidly connect the first inlet F1 and the hollow portion 117. The first inflow passage P1 may be arranged between the first outer body surface 111 and the first inner body surface 114.

The piston body 110 may include a second inflow passage P2. The second inflow passage P2 may be configured to fluidly connect the second inlet F2 and the hollow portion 117. The second inflow passage P2 may be arranged between the first outer body surface 111 and the first inner body surface 114. The second inflow passage P2 may be substantially in line with the first inflow passage P1.

The piston body 110 may include an outlet F3. The outlet F3 may be configured to allow material in the hollow portion 117 to exit the piston body 110. The outlet F3 may be defined on the second outer body surface 112.

The piston body 110 may include a slot SL. The slot SL may be arranged between the side outer body surface 113 and the side inner body surface 116. The slot SL may be arranged in the third inner side area 116C.

Figure 7:
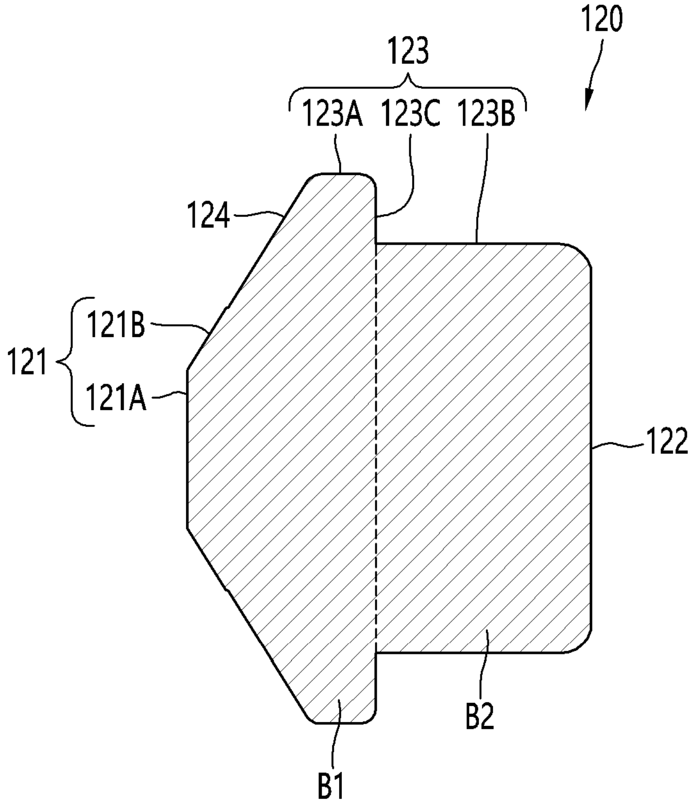
FIG. 7 is a side-sectional side view of a weight according to an embodiment of the present disclosure.

FIG. 7 is a cross-sectional view of a weight according to an embodiment of the present disclosure.

Referring to FIGS. 3 to 5 and 7, the piston 106 may include a weight 120. The weight 120 may allow movement of at least one substance (e.g., oil) between the front space of the piston body 110 and the rear space of the piston body 110, and may block movement of other substances (e.g., pure adipose tissue from which oil has been removed).

The weight 120 may include a first outer weight surface 121 (e.g., front outer weight surface), a second outer weight surface 122 opposite to the first outer weight surface 121 (e.g., rear outer weight surface), and a side outer weight surface 123 between the first outer weight surface 121 and the second outer weight surface 122.

The first outer weight surface 121 may include a first outer weight region 121A. The first outer weight region 121A may face the first inner region 114A of FIG. 6, for example. For instance, when centrifugal force acts in a direction away from the rotational shaft X of the piston 106 in FIG. 2, the first outer weight region 121A may not contact the first inner region 114A and may form a gap with the first inner region 114A.

The first outer weight surface 121 may include a second outer weight region 121B. The second outer weight region 121B may include sloped surfaces with respect to the first outer weight region 121A and the side outer weight surface 123, respectively. The slope angles formed by the first outer weight region 121A and the second outer weight region 121B may be substantially the same as the slope angles formed by the first inner region 114A and the second inner region 114B, respectively. The second outer weight region 121B may be disposed between the first outer weight region 121A and the side outer weight surface 123. The second outer weight region 121B may face the second inner region 114B of FIG. 6. For instance, when centrifugal force acts in a direction away from the rotational shaft X of the piston 106 in FIG. 2, the second outer weight region 121B may partially contact the second inner region 114B.

The side outer weight surface 123 may include a first side weight region 123A. The first side weight region 123A may be directly or indirectly connected to the second outer weight region 121B. The first side weight region 123A may define the first outer diameter of the weight 120.

Side external weight surface 123 may include a second side weight region 123B. The second side weight region 123B may be positioned between the first side weight region 123A and the second external weight surface 122. The second side weight region 123B may be directly or indirectly connected to the first side weight region 123A. The second side weight region 123B may be directly connected to the second external weight surface 122. The second side weight region 123B may define the second external diameter of the weight 120. The second external diameter may be smaller than the first external diameter.

The side external weight surface 123 may include a weight stepped region 123C. The weight stepped region 123C may be positioned between the first side weight region 123A and the second side weight region 123B.

The side external weight surface 123 may face the side inner body surface 116. The side external weight surface 123 may be separated from the side inner body surface 116. For example, regardless of whether centrifugal force acts on the piston 106 of FIG. 2, the side external weight surface 123 may be spaced apart from the side inner body surface 116.

The weight 120 may include a first weight part B1 and a second weight part B2. The first weight part B1 may be defined by the first external weight region 121A, the second external weight region 121B, the first side weight region 123A, and the weight stepped region 123C. The second weight part B2 may be defined by the second side weight region 123B and the second external weight surface 122.

The weight 120 may include a recess 124. The recess 124 may be formed in the second external weight region 121B. The recess 124 may be positioned between the first external weight region 121A and the first side weight region 123A. The recess 124 may be separated from the first external weight region 121A. The recess 124 may be directly connected to the first side weight region 123A. The recess 124 may extend in the circumferential direction of the weight 120.

Referring to FIG. 3 to FIG. 5, the piston 106 may include a plurality of external seals 130. The plurality of external seals 130 may be configured to seal the space between the inner surface of the container 1051 of FIG. 2 and the outer side surface 113 of the piston body 110 of FIG. 6. For example, the plurality of external seals 130 may each include a ring in the shape of an O. The plurality of external seals 130 may be partially or entirely disposed in the plurality of grooves G.

Referring to FIG. 3 to FIG. 5, the piston 106 may include an internal seal 140. The internal seal 140 may be configured to seal the space between the piston body 110 and the plunger (e.g., plunger 107 of FIG. 13). The internal seal 140 may be in contact with the outer surface of the plunger, at least partially. The internal seal 140 may be positioned on the second inner area 116B of FIG. 6.

Figure 8:
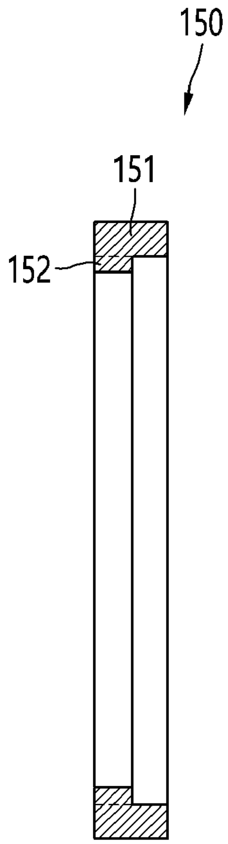
FIG. 8 is a sectional view of a stopper according to an embodiment of the present disclosure.
Figure 9:
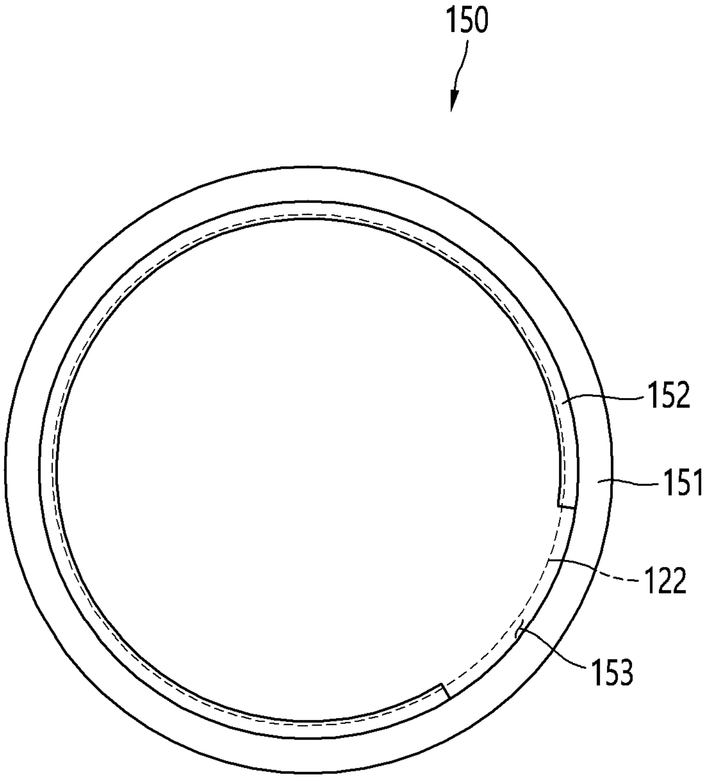
FIG. 9 is a plan view of the stopper according to an embodiment of the present disclosure.

FIG. 8 is a sectional view of a stopper according to an embodiment of the present disclosure. FIG. 9 is a plan view of the stopper according to an embodiment of the present disclosure.

Referring to FIG. 3 to FIG. 5, FIG. 8, and FIG. 9, the piston 106 may include a stopper 150. The stopper 150 may restrain the internal seal 140 of FIG. 3 to FIG. 5 in the second inner area 116B of FIG. 6. The stopper 150 may be positioned on the second inner area 116B. The stopper 150 may be adjacent to the first inner area 116A, and the internal seal 140 may be adjacent to the third inner area 116C.

The stopper 150 may include a first base 151. The first base 151 may have a ring shape or an oval shape. The first base 151 may be in contact with the second inner area 116B. The first base 151 may be in contact with the internal seal 140.

The stopper 150 may include a protrusion 152. The protrusion 152 may protrude from the first base 151 in a radial and inward direction. The inner diameter of the protrusion 152 may be smaller than the inner diameter of the first base 151. The protrusion 152 may extend at least partially in the circumferential direction of the first base 151, and may be connected to the end surface of the first base 151 (e.g., the front end surface in FIG. 8).

The stopper 150 may include a notch 153. The notch 153 may be formed in the protrusion 152 in an extension direction of the protrusion 152. For example, the notch 153 may allow movement of materials when the weight stepped region 123C comes into contact with the protrusion 152.

Referring to FIG. 4 and FIG. 5, the piston 106 may include a fastening portion 160. The fastening portion 160 may fix the internal seal 140 to the second side inner area 116B in cooperation with the stopper 150. The fastening portion 160 may be positioned on the third side inner area 116C.

The fastening portion 160 may include a second base 161. The second base 161 may have a ring shape or an oval shape. The second base 161 may be in contact with the third inner area 116C. The second base 161 may be in contact with the internal seal 140.

The fastening portion 160 may include a screw thread 162. The screw thread 162 may be configured to be fastened with an external fastening means (e.g., plunger 107 of FIG. 13). The screw thread 162 may be formed at least partially on the inner surface of the second base 161.

The fastening portion 160 may include a tongue 163. The tongue 163 may be configured to engage with a slot SL. The tongue 163 may be positioned on the outer surface of the second base 161.

Figure 10:
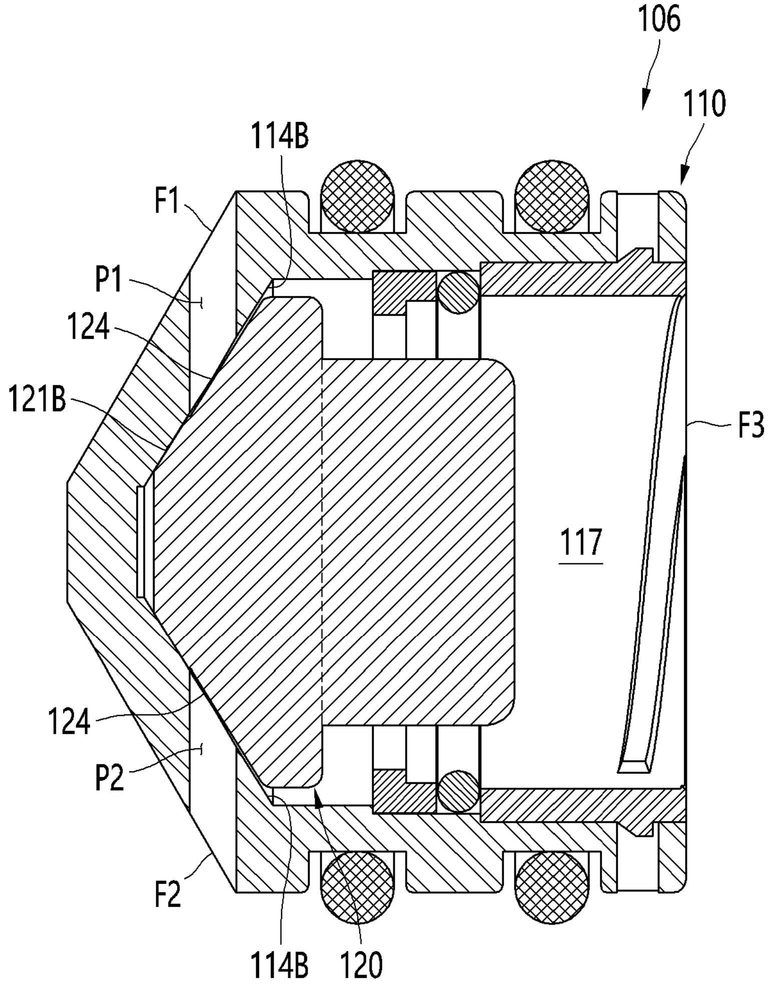
FIG. 10 is a sectional view of a first type of the centrifugal piston according to an embodiment of the present disclosure.
Figure 11:
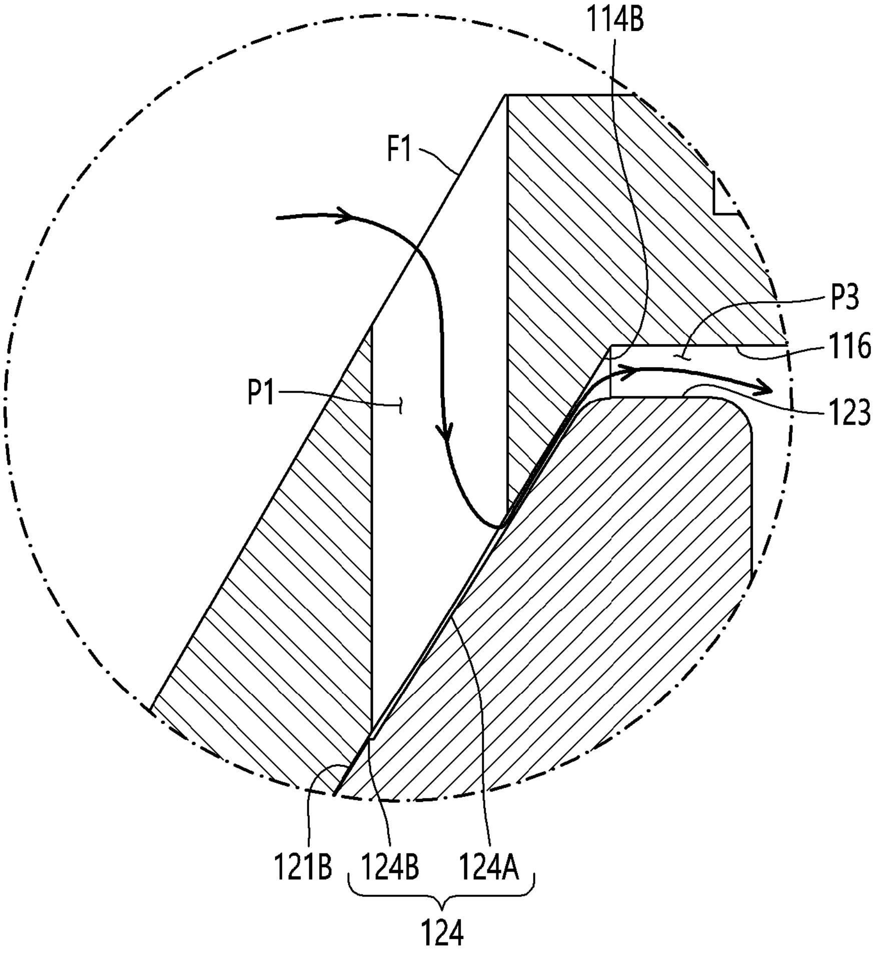
FIG. 11 is an enlarged view of the centrifugal piston of FIG. 10 according to an embodiment of the present disclosure.

FIG. 10 is a sectional view of a first form of a centrifugal piston according to an embodiment of the present disclosure. FIG. 11 is an enlarged view of the centrifugal piston of FIG. 10 according to an embodiment of the present disclosure.

Referring to FIGS. 10 and 11, centrifugal force may act on the piston 106 in the direction away from the rotational shaft X of FIG. 2. In the centrifugal environment, the centrifugal force acting on the weight 120 with the first weight may be greater than the centrifugal force acting on the piston body 110 with the second weight which is smaller than the first weight. In a case in which the centrifugal force acting on the weight 120 is greater than the sum of other forces (e.g., gravity, friction, and/or other forces acting on the weight 120), the weight 120 can move away from the outlet F3 in the direction away from the piston body 110. The second outer weight area 121B may come into contact with the second inner area 114B. When the second outer weight area 121B is in contact with the second inner area 114B, the recess 124 may be maintained in a spaced-apart state from the second inner area 114B. Accordingly, a gap may be formed between the second inner area 114B and the recess 124. The hollow portion 117 may include a discharge passage P3 that includes gaps between the second inner area 114B and the recess 124 and a gap between the side inner body surface 116 and the side outer weight surface 123.

The substances located in front of the piston body 110 can be separated by layers in the order of lower density materials to higher density materials in the centrifugal environment in the direction away from the piston body 110. The material with the lowest density (e.g., oil) can be introduced into the hollow portion 117 through the first inlet F1 and the second inlet F2 via the first inflow passage P1 and the second inflow passage P2. The introduced material can be discharged to the outside through the discharge passage P3 along the recess 124.

The recess 124 may include a recess bottom surface 124A. The recess bottom surface 124A may be directly connected to the side outer weight surface 123. The recess bottom surface 124A may form a gap with the second inner area 114B. The gap may substantially have a predetermine size along the recess bottom surface 124A. Here, the size of the gap may be determined by the distance between the second inner area 114B and the recess bottom surface 124A. The gap may be as large as to make only the target material (e.g., oil) pass through but not to make the remaining materials (e.g., adipose tissue) pass through. For example, the gap may have a size of about 50 μm to about 200 μm.

When the second outer weight area 121B comes into contact with the second inner area 114B, the recess bottom surface 124A may overlap with the first inflow passage P1 and the second inflow passage P2. The recess bottom surface 124A may overlap with the surrounding area of the first inlet P1 and the second inlet P2 of the second inner area 114B.

The recess bottom surface 124A may extend in the circumferential direction of the weight 120. The recess bottom surface 124A may be formed along the entire circumference of the weight 120.

The recess 124 may include a recess wall surface 124B. The recess wall surface 124B may be disposed between the second outer weight area 121B and the recess bottom surface 124A. The recess wall surface 124B may be arranged between the second outer weight area 121B and the recess bottom surface 124A. The recess wall surface 124B may define a stepped portion between the second outer weight area 121B and the recess bottom surface 124A.

When the second outer weight area 121B comes into contact with the second inner area 114B, the recess wall surface 124B may not overlap with the first inlet P1 and the second inlet P2.

Figure 12:
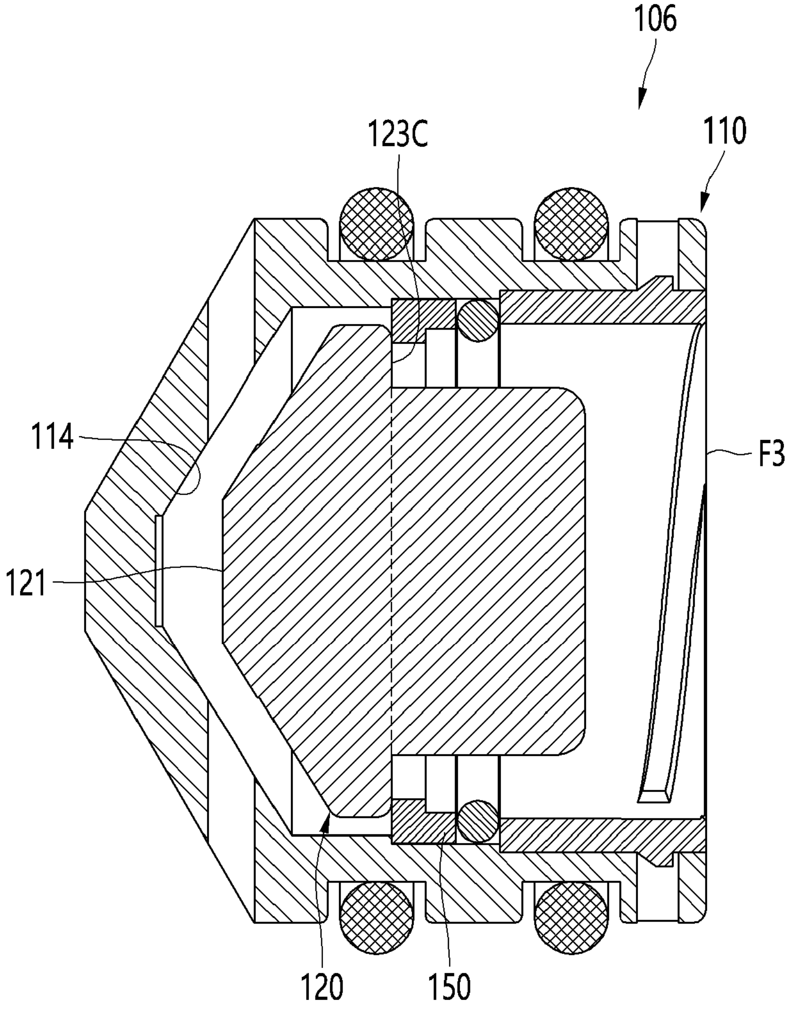
FIG. 12 is a sectional view of a second type of the centrifugal piston according to an embodiment of the present disclosure.

FIG. 12 is a sectional view of a second form of a centrifugal piston according to an embodiment.

Referring to FIG. 12, in a case in which centrifugal force does not act on the piston 106 or the magnitude of the centrifugal force is smaller than the magnitude of another force acting on the weight 120, the weight 120 may move in a direction facing the outlet F3 of the piston body 110. The first outer face of the weight 121 may be released from the first inner body face 114. The stopper 150 may limit the movement of the weight 120 to prevent it from moving out of the piston body 110. For example, the weight stepped region 123C may come into contact with a portion of the stopper 150 (e.g., protrusions 152 of FIGS. 8 and 9).

Figure 13:
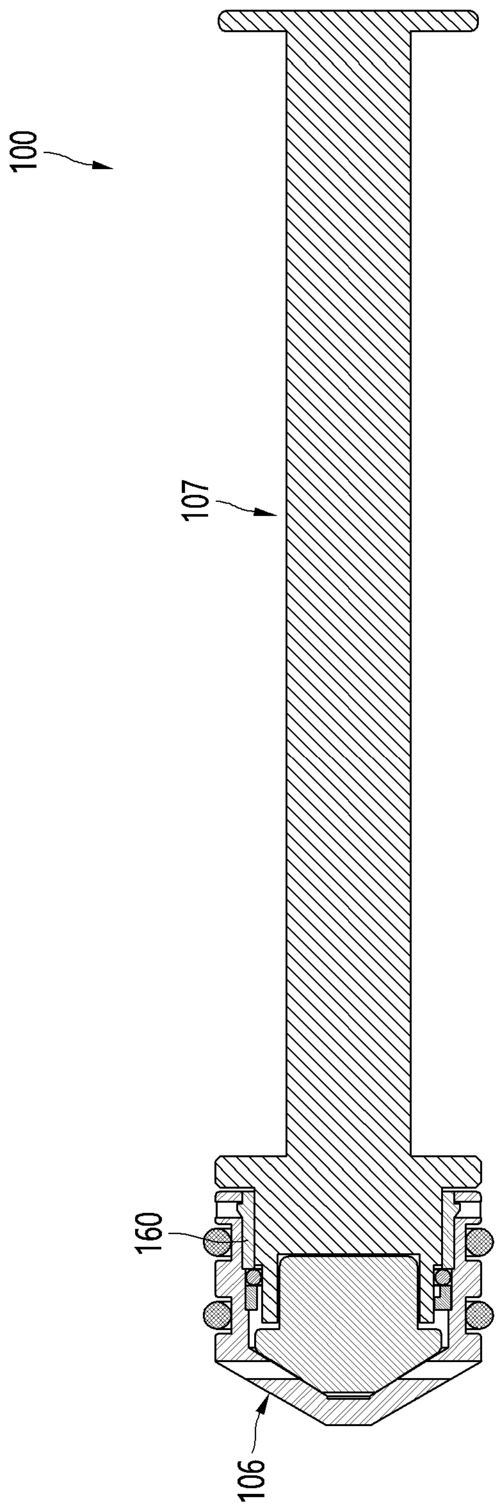
FIG. 13 is a sectional view of a centrifugal separation device including a plunger and a centrifugal piston according to an embodiment of the present disclosure.

FIG. 13 is a sectional view of a centrifugal separation device including a plunger and a centrifugal piston according to an embodiment.

Referring to FIG. 13, the centrifugal separation device 100 may include a plunger 107. The plunger 107 may be configured to couple with the piston 106. For example, the plunger 107 may be screw-coupled with the screw thread 162 of FIG. 5.

Although embodiments have been described with reference to limited drawings, various technical modifications and changes may be made based on common knowledge in the art. For example, the described techniques may be performed in a different order, and/or components of the described systems, structures, devices, circuits, etc., may be combined or assembled in a different form from that described. Other components or equivalents may be substituted or replaced by equivalent components or equivalents.

Accordingly, other implementations, other embodiments, and equivalents thereof are included within the scope of the appended claims.

The invention claimed is:

1. A centrifugal piston comprising:

a piston body; and a weight, wherein the piston body comprises:

a first outer body surface;

a second outer body surface opposite to the first outer body surface;

a side outer body surface between the first outer body surface and the second outer body surface;

a first inner body surface opposite to the first outer body surface;

a side inner body surface connected to the first inner body surface and opposite to the side outer body surface;

a first inlet disposed in the first outer body surface;

an outlet disposed in the second outer body surface;

a hollow portion defined by the first inner body surface and the side inner body surface; and a first inflow passage connecting the first inlet and the hollow portion, wherein the weight is arranged in the hollow portion, and comprises:

a first outer weight surface facing the first inner body surface;

a second outer weight surface opposite to the first outer weight surface;

a side outer weight surface between the first outer weight surface and the second outer weight surface; and a recess disposed on the first outer weight surface, wherein, in a centrifugal environment, when the first outer weight surface comes into contact with the first inner body surface, the weight is configured to form a gap between the first inner body surface and the recess, and wherein at least one substance centrifugally separated from biological tissues is discharged through the first inlet, the first inflow passage, the gap, and the outlet.

2. The centrifugal piston according to claim 1, wherein the gap has a size ranging from 50 μm to 200 μm, measured as a distance between the first inner body surface and a bottom surface of the recess.

3. The centrifugal piston according to claim 1, wherein the gap has a constant size between the first inner body surface and a bottom surface of the recess.

4. The centrifugal piston according to claim 1, wherein the hollow portion includes a discharge passage which connects the first inflow passage and the outlet and includes the gap.

5. The centrifugal piston according to claim 1, wherein the recess includes:

a recess wall surface intersecting the first outer weight surface; and a recess bottom surface between the recess wall surface and the side outer weight surface.

6. The centrifugal piston according to claim 5, wherein the recess wall surface does not overlap with the first inflow passage.

7. The centrifugal piston according to claim 5, wherein the recess bottom surface overlaps with both the first inflow passage and the first inner body surface.

8. The centrifugal piston according to claim 5, wherein the recess bottom surface is directly connected to the side outer weight surface.

9. The centrifugal piston according to claim 1, wherein the recess is formed in the circumferential direction of the weight.

10. The centrifugal piston according to claim 1, wherein the piston body further comprises:

a second inlet disposed in the first outer body surface; and a second inflow passage connecting the second inlet and the hollow portion.

11. The centrifugal piston according to claim 1, further comprising:

a seal disposed on the side inner body surface and configured to seal a space between a plunger and the outlet.

12. The centrifugal piston according to claim 11, further comprising:

a stopper disposed on the side inner body surface and between the weight and the seal, and configured to restrict the movement of the seal.

13. The centrifugal piston according to claim 1, further comprising:

a fastening portion disposed between the weight and the outlet.

14. A centrifugal separation device comprising:

a rotational shaft;

a syringe configured to rotate around the rotating shaft and configured to hold biological tissues; and a centrifugal piston arranged inside the syringe, wherein the centrifugal piston comprises a piston body and a weight, wherein the piston body comprises:

a first outer body surface;

a second outer body surface opposite to the first outer body surface;

a side outer body surface between the first outer body surface and the second outer body surface;

a first inner body surface opposite to the first outer body surface;

a side inner body surface connected to the first inner body surface and opposite to the side outer body surface;

a first inlet disposed in the first outer body surface;

an outlet disposed in the second outer body surface;

a hollow portion defined by the first inner body surface and the side inner body surface; and a first inflow passage connecting the first inlet and the hollow portion, wherein the weight is arranged in the hollow portion, and comprises:

a first outer weight surface facing the first inner body surface;

a second outer weight surface opposite to the first outer weight surface;

a side outer weight surface between the first outer weight surface and the second outer weight surface; and a recess disposed on the first outer weight surface, wherein, in a centrifugal environment that the syringe rotates around the rotational shaft, when the first outer weight surface comes into contact with the first inner body surface, the weight is configured to form a gap between the first inner body surface and the recess, and wherein at least one substance centrifugally separated from biological tissues is discharged through the first inlet, the first inflow passage, the gap, and the outlet.

15. A method of using a centrifugal separation device according to claim 14, the method comprising the steps of:

providing biological tissues and a centrifugal piston inside the syringe; and rotating the syringe around the rotational shaft to centrifugally separate the biological tissues, wherein the step of centrifugally separating the biological tissues comprises the step of discharging at least one substance separated from the biological tissues through the first inlet, the first inflow passage, the gap, and the outlet, when the first outer weight surface comes into contact with the first inner body surface.

* * * * *